(12) United States Patent
Sharma et al.

(10) Patent No.: US 10,867,368 B1
(45) Date of Patent: Dec. 15, 2020

(54) FOVEATED IMAGE CAPTURE FOR POWER EFFICIENT VIDEO SEE-THROUGH

(71) Applicant: Apple Inc., Cupertino, CA (US)

(72) Inventors: Anup K. Sharma, Sunnyvale, CA (US); Andrew K. McMahon, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 73 days.

(21) Appl. No.: 16/146,942

(22) Filed: Sep. 28, 2018

Related U.S. Application Data (60) Provisional application No. 62/565,827, filed on Sep. 29, 2017.

(51) Int. Cl.
  *G06T 3/40* (2006.01)
  *G06T 1/20* (2006.01)

(52) U.S. Cl.
  CPC .............. *G06T 3/4053* (2013.01); *G06T 1/20* (2013.01)

(58) Field of Classification Search
  None
  See application file for complete search history.

(56) References Cited

U.S. PATENT DOCUMENTS

| 6,252,989 | B1 | 6/2001 | Geisler |
| 6,351,335 | B1 | 2/2002 | Perlin |
| 7,010,169 | B2 | 3/2006 | Kortum |
| 8,582,805 | B2 | 11/2013 | Monacos |
| 8,721,341 | B2 | 5/2014 | Mitchell |
| 9,030,583 | B2 | 5/2015 | Gove |
| 9,230,302 | B1 | 1/2016 | Owechko |
| 9,316,834 | B2 | 4/2016 | Makino |
| 9,547,174 | B2 | 1/2017 | Gao |
| 2004/0227703 | A1 | 11/2004 | Lamvik |
| 2005/0117015 | A1 | 6/2005 | Cutler |
| 2010/0056274 | A1 | 3/2010 | Uusitalo |
| 2013/0016178 | A1 | 1/2013 | Birkbeck |
| 2014/0218468 | A1 | 8/2014 | Gao |
| 2014/0247277 | A1 | 9/2014 | Guenter |
| 2015/0178939 | A1 | 6/2015 | Bradski |
| 2015/0243102 | A1 | 8/2015 | Schowengerdt |
| 2016/0267717 | A1 | 9/2016 | Bar-Zeev |
| 2018/0189574 | A1* | 7/2018 | Brueckner ......... H04N 5/23235 |

FOREIGN PATENT DOCUMENTS

| EP | 1403680 A1 | 3/2004 |
| EP | 3091742 A1 | 11/2016 |
| WO | 2014197226 A1 | 12/2014 |

* cited by examiner

*Primary Examiner* — Dov Popovici
(74) *Attorney, Agent, or Firm* — Blank Rome LLP (57) ABSTRACT

Generating an image stream may include obtaining image data from a camera, identifying a first subset of the image data including a region of interest, identifying a second subset of the image data different than the first subset of the image data, processing the first subset of image data by a first processing pipeline to obtain a first processed set of image data, processing the second subset of image data by a second processing pipeline to obtain a second processed set of image data, wherein the second processing pipeline processes at a lower quality than the first processing pipeline, and combining the first processed set of image data and the second processed set of image data to obtain a processed image frame.

20 Claims, 6 Drawing Sheets

FOVEATED IMAGE CAPTURE FOR POWER EFFICIENT VIDEO SEE-THROUGH

BACKGROUND

This disclosure relates generally to the field of digital image processing, and more particularly to the field of foveated image capture for power efficient video see-through. There are many uses for processing a video feed, including live streaming and use in augmented reality (AR) contexts. Generally, one of the goals in processing image data for a video feed is to reduce power cost of a video camera. Processing all image data at a single quality level can use a high level of resources so as to affect system performance. Additionally, processing all image data at a high quality level can lead to latency issues and could lead to an unpleasant user experience. Further, processing image data at a lower quality level often can also be detrimental. Image quality at a lower resolution may also lead to an unpleasant user experience.

SUMMARY

In one embodiment, a method for generating an image stream is described. The method includes obtaining image data from a camera, identifying a first subset of the image data comprising a region of interest, identifying a second subset of the image data different than the first subset of the image data, processing the first subset of image data by a first processing pipeline to obtain a first processed set of image data, processing the second subset of image data by a second processing pipeline to obtain a second processed set of image data, wherein the second processing pipeline processes at a lower quality than the first processing pipeline, and combining the first processed set of image data and the second processed set of image data to obtain a processed image frame. In another embodiment, the method may be embodied in computer executable program code and stored in a non-transitory storage device. In yet another embodiment, the method may be implemented in an electronic device having image capture capabilities.

DETAILED DESCRIPTION

This disclosure pertains to systems, methods, and computer readable media for foveated image capture for power efficient video. By applying foveated image processing techniques to video capture, image data may be captured and processed in a more efficient manner. In general, techniques are disclosed for obtaining video image data of the environment and processing the image data in a way that a particular region of the captured scene is processed at a higher quality than another portion of the scene, such as a background. Thus, a particular frame of the video image data may have one portion, such as a portion of the image containing a region of interest, at a higher quality than other portions of the image, which may not be as interesting to a viewer. In order to capture a unique picture, but selectively process a region that is deemed of higher importance to a user at a higher quality than a region considered of lesser importance, two data flows from a video image data from a single camera may be utilized.

In one or more embodiments, generating a frame of an image stream may include obtaining image data from a camera, such as image data for a frame of a video stream. A region of interest in the scene may be identified in any number of ways, and the portion of the image data that includes the region of interest may be processed using a first processing pipeline. A second portion of the image data, which may include, for example, the portion of the image data not including first portion, or the entire image data for the frame (capturing the entire scene), may be processed by a second processing pipeline, which may produce lower quality image data, but may be more efficient than the first processing pipeline. The two sets of processed image data may then be combined to form a composite image data, or a processed image frame. According to one or more embodiments, by only processing a portion of the image data that includes the region of interest for each frame, the resulting video image data may be processed in an efficient manner.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100A and 100B). Further, as part of this description, some of this disclosure's drawings may be provided in the form of a flow diagram. The boxes in any particular flow diagram may be presented in a particular order. However, it should be understood that the particular flow of any flow diagram or flow chart is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

Figure 1:
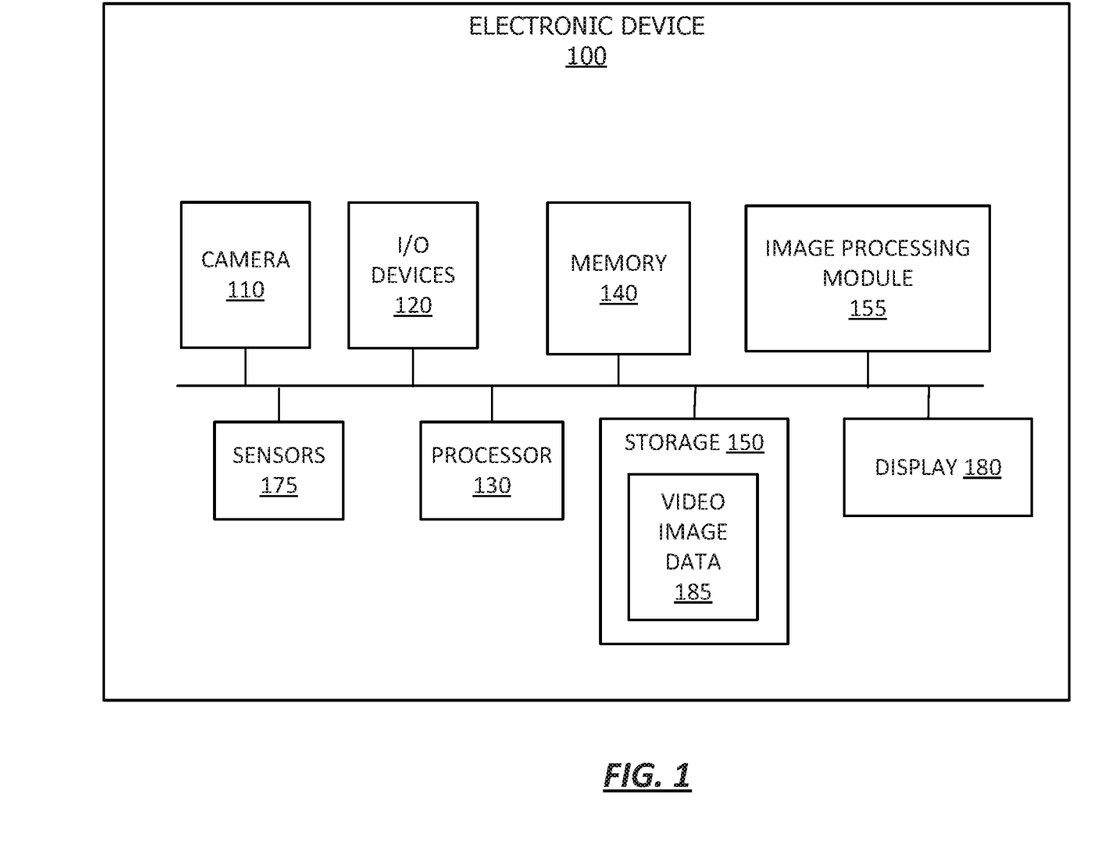
FIG. 1 shows, in block diagram form, a simplified electronic device according to one or more embodiments.

Referring to FIG. 1, a simplified block diagram of an electronic device 100 is depicted in accordance with one or more embodiments of the disclosure. Electronic device 100 may be part of a multifunctional device such as a mobile phone, tablet computer, personal digital assistant, portable music/video player, or any other electronic device that includes a camera system and a display. Further, electronic device 100 may be part of a larger system of components that includes a camera and a display. Electronic Device 100 may be connected to other devices across a network such as other mobile devices, tablet devices, desktop devices, as well as network storage devices such as servers and the like. Electronic device 100 may be configured to capture image data corresponding to a scene and use the captured image data to render views on a display viewable by a user.

Electronic Device 100 may include a processor 130. Processor 130 may be a central processing unit (CPU). Processor 130 may alternatively, or additionally, include a system-on-chip such as those found in mobile devices and include zero or more dedicated graphics processing units (GPUs). Also connected on the bus may be image processing module 155, which may be a software or hardware module which may be used for foveated image capture. Electronic Device 100 may also include memory 140 and storage 150. Memory 140 and storage 150 may each include one or more different types of memory, which may be used for performing device functions in conjunction with processor 130. For example, memory 140 may include cache, ROM, and/or RAM. Memory 140 may store various programming modules during execution. In one or more embodiments, storage 150 may comprise cache, ROM, RAM, and/or non-volatile memory, and may store video image data 185. Video image data 185 may include raw image data captured by camera 110 and/or processed image data, such as a foveated image data generated by the image processing module 155 processing the raw image data.

Electronic device 100 may also include one or more cameras 110. Each camera 110 may include an image sensor, a lens stack, and other components that may be used to capture images. Further, in some embodiments image sensors may be shared between different lens stacks. In one or more embodiments, cameras 110 may be configured to capture still pictures, or video feed.

Electronic device 100 may include one or more sensors 175, which may provide information about a surrounding environment. For example, sensors 175 may include sensors configured to detect brightness, depth, location, and other information regarding the environment. Electronic device 100 may also include a display 180, which may be an additive display. For example, display 180 may be a transparent or semi-opaque display, such as a heads-up display, by which an image may be projected over a transparent surface. Thus, display 180 may be comprised of a projector and a surface, or may just include the projector. Further, display 180 may be a transparent display, such as an LCD display and/or a head mounted display. Electronic device 100 may additionally include I/O devices 120, such as speakers and the like. In one or more embodiments, the various I/O devices 120 may be used to assist in image processing to generate a foveated image feed, such as by receiving user input to identify a region of interest in a scene.

According to one or more embodiments, I/O devices 120 may additionally include a touch screen, mouse, track pad, and the like.

Memory 140 may include instructions, such as computer readable code executable by processor 130 to perform various actions. For example, image processing module 155 may include instructions that cause electronic device 100 to assist in processing image data captured by camera 110 to generate a foveated image feed. Image processing module 155 may determine a region of interest and cause a portion of the image data received from the camera 110 that include the region of interest to be processed at a higher quality than image data that does not include the region of interest. In one or more embodiments, the image processing module 155 may determine a region of interest based on data received from sensors 175, which may indicate, for example, a portion of a scene captured by camera 110 that is more dynamic, and thus perhaps more interesting, than another portion of the image data. In an alternative embodiment, the image processing module 155 may request and/or receive user input indicating a portion of a scene which includes a region of interest. Further, image processing module 155 may generate compose images based on the processed image data from the first and second pipelines to generate the foveated image.

Figure 2:
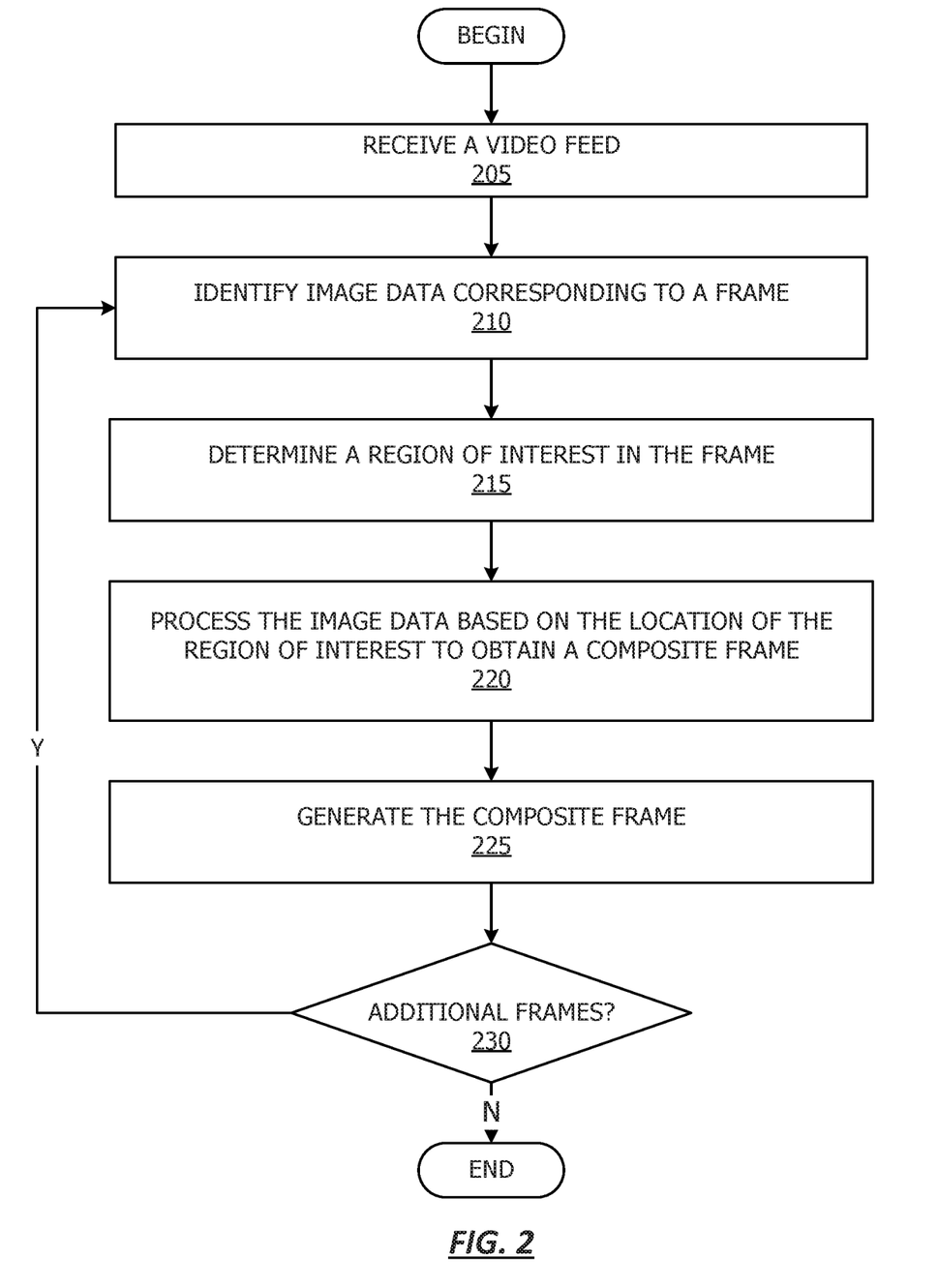
FIG. 2 shows, in flowchart form, a method for generating a foveated image frame, according to one or more embodiments.

FIG. 2 shows, in flowchart form, a method for generating a foveated image frame, according to one or more embodiments. Although the various actions are depicted in a particular order, in some embodiments the various actions may be performed in a different order. In still other embodiments, two or more of the actions may occur simultaneously. According to yet other embodiments, some of the actions may not be required or other actions may be included. For purposes of clarity, the flowchart will be described with respect to the various components of FIG. 1. However, it should be understood that the various actions may be taken by alternative components, according to one or more embodiments.

The flowchart begins at 205, where the image processing module obtains image data of a real environment. In one or more embodiments, the image data may be raw image data obtained using camera 110, and may be part of a video feed. Thus, according to one or more embodiments the camera 110 will read out image data for a full field of view. The video feed may be captured in real time such that the foveated image is rendered as the video feed is captured. Alternatively, the video feed may be previously captured, and may be obtained from storage, such as video image data 185 in storage 150, or a network storage accessible by electronic device 100 across a network. The flowchart continues at 210, and the image processing module 155 determines image data corresponding to a particular frame.

The flowchart continues at 215 and the image processing module 155 determines a region of interest in the frame. In one or more embodiments, the region of interest may be determined in the sensor, for example by control from the image processing module 155 or the processor 130. Further, in one or more embodiments, the region of interest may be determined in the processor 130. In addition, the sensor could also incorporate different readout mechanisms for different pixels within each ROI such that one ROI readout is configured for optimal imaging performance and the other ROI(s) are configured for readout with a more power-frugal lower performance.

According to one or more embodiments, the region of interest may correspond to a portion of the captured scene in which action is taking place, or which otherwise includes content that would be a point of focus in the scene. The region of interest may be determined in any number of ways. For example, the image processing module 155 may receive sensor data from sensors 175 that indicate where movement in the scene is occurring. In addition, sensors 175 may capture depth information, for example, that identifies a foreground object in the scene. Image processing module 155 may determine that a portion of the image data corresponding to the region in which the action is captured contains the region of interest. A region of interest may correspond to a portion of the image data that captures an image of a region associated with relatively high perception value in a scene.

Further, in one or more embodiments, the region of interest may vary in size based on a number of factors. For example, the size of the region of interest may be proportional to available resources. That is, if there is sufficient available power or compute cycles, the region of interest may be larger. Conversely, if power resources, available compute cycles are low, then a smaller region of interest may be utilized. As another example, the size of the regions of interest may be related to a confidence value for the region of interest. As an example, a confidence value may be determined corresponding to the likelihood that the determined region of interest should actually be the region of interest (e.g., the determined region of interest is actually associated with relatively high perception value in a scene). As such, if a determined region of interest is associated with a high confidence value, then a smaller region of interest may be utilized because the smaller region is more likely to have a relatively high perception value.

In one or more embodiments, the sensor data from sensors 175 may also be used to determine a view direction of a user. For example, the sensors 175 may include an eye tracking camera or other type of sensor utilized to track a gaze direction of a user, or otherwise provide data such that a gaze direction of a user may be determined. Thus, the image processing module 155 may determine a location in a scene in which a user is gazing, and the image processing module 155 may identify a portion of the image data corresponding to image data for the region of the scene at which the user is gazing. The identified portion of the image data may be determined to be the region of interest. In another example, the image processing module 155 may determine a region of interest to be a default region, such as a central portion of image data for a captured scene. As another example, the region of interest may default based on a predetermined optimal foveation based on particular characteristics of the electronic device 100, or another device utilized for image capture or display. Further, in another embodiment, the region of interest may be determined based on user input. As an example, image processing module 155 may utilize user input received from I/O devices 120 to determine a region of interest. For example, a user may select a particular portion of the captured scene as the region of interest by selecting the region on a display such that future image data for that region is considered the region of interest.

In one or more embodiments, the region of interest may also be determined based on a context in which the image data is to be used. As an example, if the electronic device 100 is utilized for augmented reality (AR) purposes or other computer-generated reality (CGR) purposes, a portion of the image over which a virtual object is to be rendered may be determined to be a region of interest. Said another way, the additional virtual data may be generated and displayed over the image of the real environment, and the area over which the virtual data is to be displayed may be determined to be an area at which a user is likely to focus, and thus be a region of interest, according to one or more embodiments.

A CGR environment may be contrasted from a physical environment in that the CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The flowchart continues at 220, and the image processing module 155 processes the image data based on the location of the region of interest to obtain a composite image frame. As will be described in further detail below with respect to FIG. 3, the image processing module 155 may direct that a first subset of the image data that includes the region of interest be processed through a first processing pipeline, whereas a second subset of the image data is processed through a second processing pipeline which is more efficient than the first processing pipeline. Said another way, the image processing module 155 may create two data flows, including a first data flow capturing the region of interest to be rendered at a higher resolution, and a second data flow capturing additional image data of the scene which is to be rendered at a lower resolution. The terms "low," "lower," "high," "higher," and the like may be used herein to reference resolution or other quality measures of captured image data, and do not refer to any particular quality or resolution measure, but are used to contrast the different resolutions or quality levels that may be rendered by the electronic device 100. In one or more embodiments, processing the second subset of image data in the second processing pipeline may include the image processing module 155 downsampling the second subset of image data and directing the downsampled second subset of image data to be processed in the first processing pipeline. Thus, the second subset of data may be processed in a more efficient manner because only a portion of the second subset of data (i.e., the downsampled data) may be processed, rather than the entirety of the second subset of data. In general, power consumption is proportional to the total pixels per frame and the frame rate. Because resolution increases as PPD increases, in one or more embodiments, PPD may be maximized across image data for a frame for a region of interest.

The flowchart continues at 225 and the composite frame is generated. According to one or more embodiments, generating the composite frame may include combining the processed first subset of image data and the processed second subset of image data to generate the processed image frame. The processed image frame is foveated because the region of interest will be processed at a higher quality level than other regions of the image.

The flowchart continues at 230 and a determination is made regarding whether the image processing module 155 identifies image data for additional frames. If so, then the flowchart continues at 210 and the image data is identified for the next frame and the process repeats. In one or more embodiments, the region of interest may be the same as when the image data prior frame was processed. Thus, when 215 is repeated, the region of interest may be determined to be the same as the prior frame, or may be different based on new information, such as sensor data or user input. In one or more embodiments, the determined region of interest for a given frame may default to the determined region of interest for a previous frame.

According to one or more embodiments, the process continues until at 230 a determination is made that there are no additional frames. Then the flowchart ends. In one or more embodiments, the generated composite frames may be displayed, for example on display 180. The generated composite frames may be displayed as they are generated, or upon the determination that there are no additional frames at 230.

Figure 3:
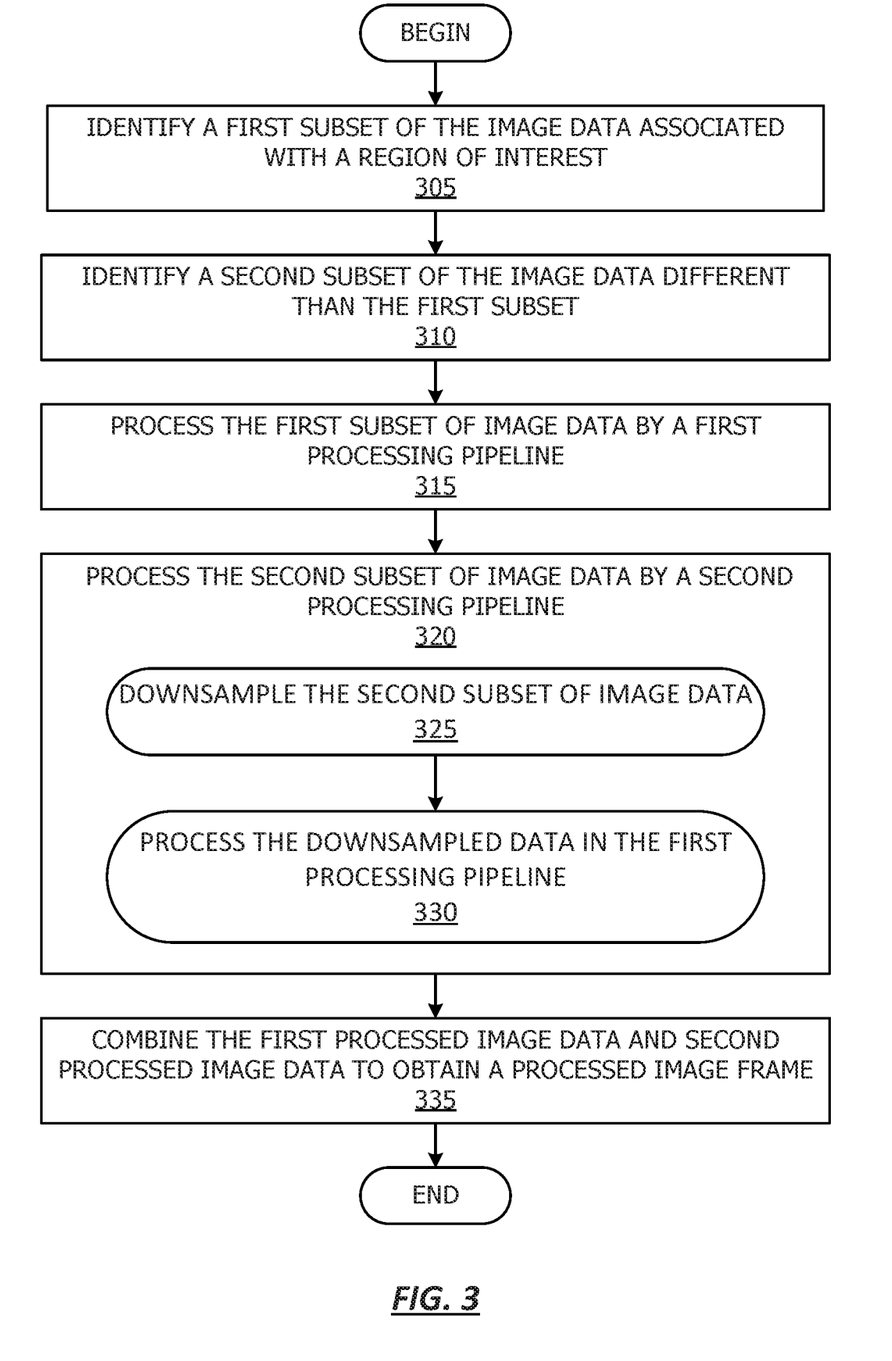
FIG. 3 shows, in flowchart form, a method for generating a composite image frame, according to one or more embodiments.

FIG. 3 shows, in flowchart form, a method for generating a composite image frame, according to one or more embodiments. Specifically, FIG. 3 shows a detailed version of steps 215-225 according to one or more embodiments.

The flowchart begins at 305 and the image processing module 155 identifies a first subset of the image data associated with a region of interest. As described above, the region of interest may be identified in any number of ways, and the determination may be based on user input, sensor data, default settings, and the like.

The flowchart continues at 310, and the image processing module 155 identifies a second subset of the image data. The second subset of image data may be different than the first subset of image data. According to one or more embodiments, the second subset of data may include the remainder of the image data for a frame that does not include the first subset of image data. In an alternative embodiment, the second subset of image data may include the entirety of the image data for a frame, including the first subset of image data.

The flowchart continues at 315 and the first subset of image data is processed by a first processing pipeline. In one or more embodiments, the first processing pipeline produces a high quality image data, and may be a higher quality image data than that produced by a second processing pipeline. For example, in one or more embodiments, the first processing pipeline produces greater pixels per degree (PPD) than the second processing pipeline. The first processing pipeline may render image data in a higher quality than a second processing pipeline in a number of way. For example, the first processing pipeline may render a higher quality image by utilizing a more aggressive noise processing, tone mapping, color rendition, desaturation, and the like.

At 320, the second subset of image data is processed by a second processing pipeline, which may produce a lower quality image than the first quality pipeline. In one or more embodiments, the second processing pipeline may include a different processing method than that of the first processing pipeline. In one or more embodiments, processing the second subset of data by a second processing pipeline may include at 325, downsampling the second subset of image data such that only a portion of the second subset of image data is considered. In one or more embodiments, downsampling reduces the pixels used to represent the images by only considering a portion of the captured pixels. Then, at 330, the downsampled second subset of data (i.e., the portion of the second subset of image data) is processed using the first processing pipeline.

The flowchart continues at 335, and the image processing module 155 combines the first processed image data and the second processed image data to obtain a processed image frame. That is, the image processing module 155 may combine the processed first subset of image data and the processed second subset of image data to obtain a processed image frame. In the instance where the second subset of image data comprises the entirety of image data for the frame, the portion of the second subset of image data corresponding to first subset of image data may be replaced by the first subset of image data.

Although the above description includes two data flows, in one or more embodiments, the image processing module 155 may generate the image frames for the video feed with additional data flows. For example, the image processing pipeline may utilize a third data flow such that image data corresponding to a region of interest is processed at a highest quality level, a region surrounding the region of interest is processed at a medium quality level, and a region surrounding the medium quality level region is processed at a lowest quality level, thus providing an extra layer of granularity to the foveation. In this example, the outermost region away from the region of interest may be downsampled the most aggressively, for example.

Figure 4:
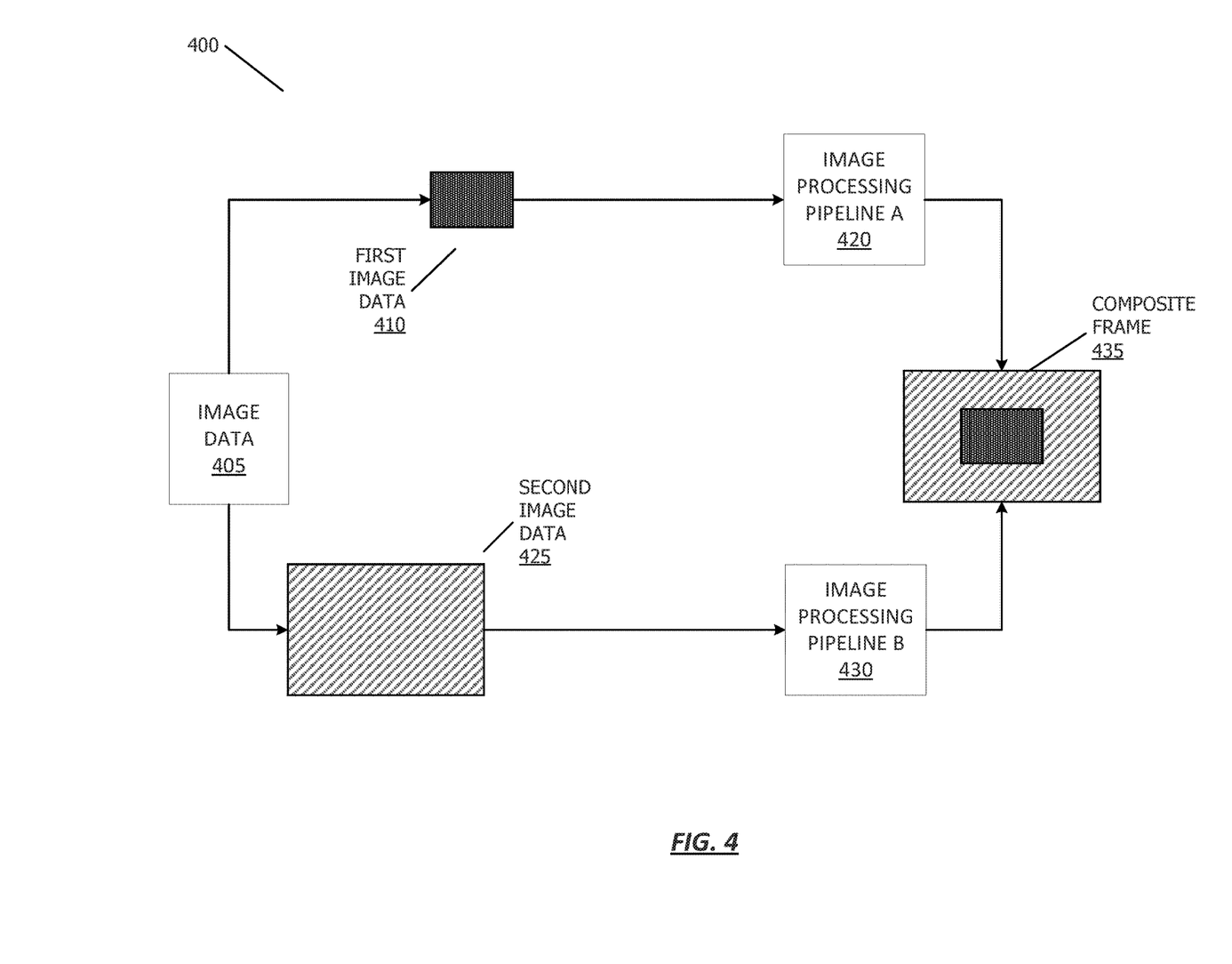
FIG. 4 shows, in flow diagram form, an example of generating a foveated image frame in accordance with one or more embodiments.

FIG. 4 shows, in flow diagram form, an example of generating a foveated image frame in accordance with one or more embodiments. The flow begins at 405, and the image processing module 155 identifies image data associated with a particular image frame to be processed. The image processing module 155 identifies a portion of the image data associated with a region of interest to obtain a first subset of image data. As described above, the portion of the image data may include image data that includes the region of interest. The identified portion of image data is, as shown, first image data 410. Although the first image data comprising the image data is depicted as a rectangular portion, the shape of the first image data comprising the region of interest may be an alternative geometric shape, such as a hexagon. Further, the shape of the first image data comprising the region of interest may be a regular or irregular shape. The image processing module 155 also identifies second image data 425, which is a second subset of the image data 405. In one or more embodiments, the second image data 425 may be different than the first image data 410. In one embodiment, the second image data 425 may include the image data 405 except for the first image data 410. In another embodiment, the second image data 425 may include all of the image data 405, including the first image data 410.

With respect to the first image data 410, the flow diagram 400 continues at image processing pipeline A 420. In one or more embodiments, image processing pipeline A 420 is configured to process image data at a high image quality. The result of the image processing pipeline A 420 processing the first image data 410 is first processed image data. The first image processing pipeline A 420 may be a first signal processing pipeline With respect to the second image data 425 the image processing module 155 directs the second image data 425 to be processed by image processing pipeline B 430. In one or more embodiments, the second image data 425 may be downsampled prior to being processed by image processing pipeline B 430. As an example, only every fourth pixel captured by the camera 110 may be processed. According to one or more embodiments, image processing pipeline B 430 is configured to process image data at a lower quality and/or in a more efficient manner than image processing pipeline A 420. The result of image processing pipeline B 430 processing second image data 425, is second processed image data.

After the first image data 410 is processed by image processing pipeline A 420 and second image data 425 is processed by image processing pipeline B 430, then the first processed image data from image processing pipeline A 420 and the second processed image data from image processing pipeline B 430 is combined to form composite frame 435. If the second image data 425 was downsampled prior to being processed by image processing pipeline B 430, then the image processing module 155 may be upscaled prior to being combined with the first processed image data to obtain the composite frame 435. For example, the image processing module 155 may paste the first processed image data into the proper location of the second processed image data to obtain a composite frame 435, resulting in a foveated image. As another example, combining the first image data and the second image data may include blending the first image data and the second image data together to form a smooth transition between the boundary of the first image data and the second image data. Thus, between a region of the first image data and a region of the second image data may be a transition region across multiple pixels. As described above, the flow diagram 400 may be repeated with the next image data for a next frame of a video feed until the video feed ceases.

Figure 5:
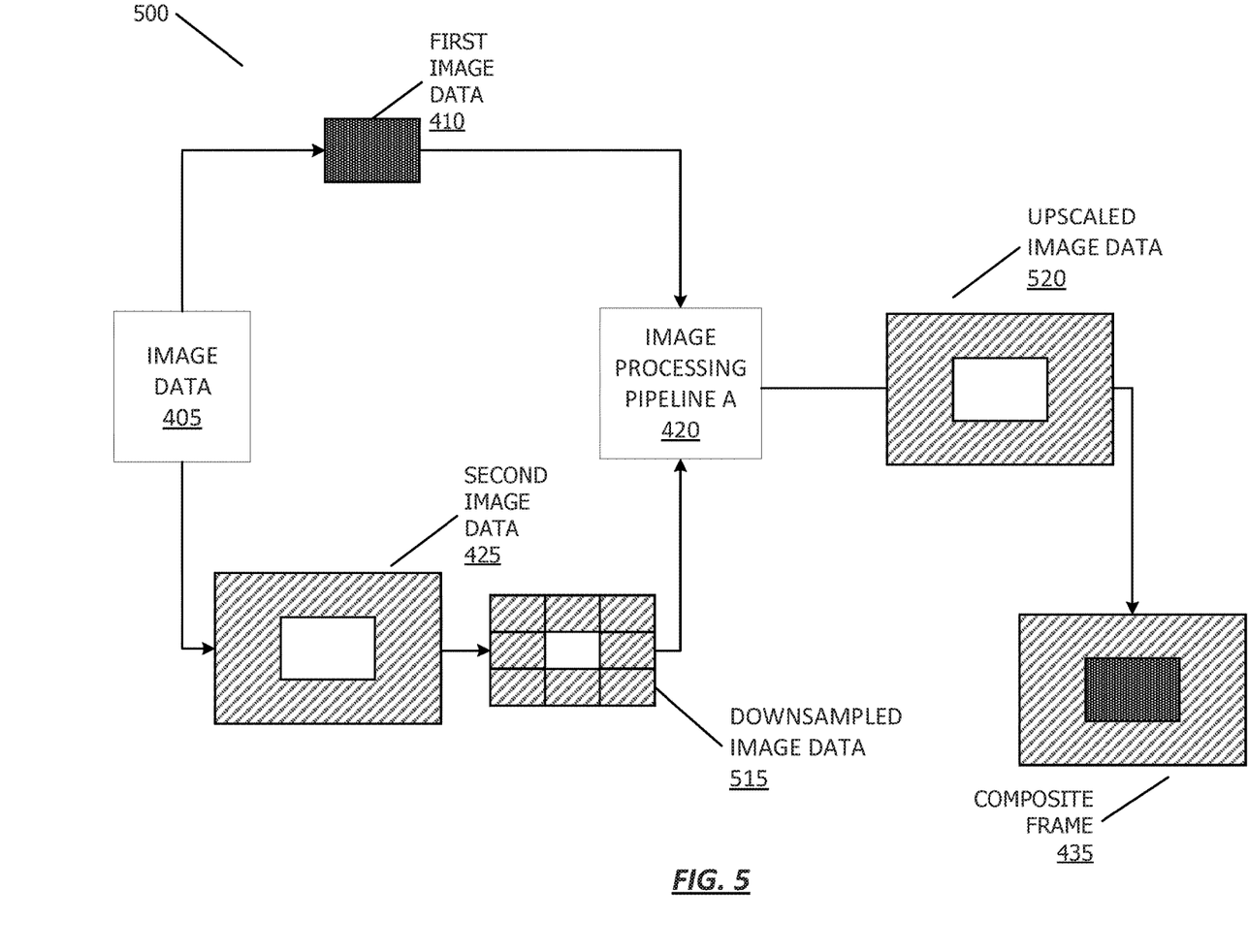
FIG. 5 shows, in flow diagram form, another example of generating a foveated image frame in accordance with one or more embodiments.

FIG. 5 shows, in flow diagram form, another example of generating a foveated image frame in accordance with one or more embodiments. The example flow diagram 500 includes many of the same components as described above with respect to FIG. 4. However, the example flow diagram 500 is intended to depict an alternative embodiment. In one or more embodiments, the various components and actions described within FIG. 4 and FIG. 5 may be optionally combined or reorganized to form additional embodiments. Thus, the particular flow diagram 500 is shown merely as an example.

The flow begins at 405, and the image processing module 155 identifies image data associated with a particular image frame to be processed. As described above, the image processing module 155 identifies a portion of the image data associated with a region of interest to obtain a first subset of image data. As described above, the portion of the image data may include image data that includes the region of interest. The identified portion of image data is, as shown, first image data 410. The image processing module 155 also identifies second image data 425, which is a second subset of the image data 405. In one or more embodiments, the second image data 425 may be different than the first image data 410. In one embodiment, the second image data 425 may include the image data 405 except for the first image data 410. As shown, the second image data 425 may include all of the image data 405, including the first image data 410. Thus, the first image data 410 may be a copy of a cropped portion of the image data 405.

With respect to the first image data 410, the flow diagram 400 continues at image processing pipeline A 420. In one or more embodiments, image processing pipeline A 420 is configured to process image data at a high image quality. The result of the image processing pipeline A 420 processing the first image data 410 is first processed image data.

Distinct from flow 400, in flow 500, respect to the second image data 425 the image processing module 155 may downsample the image data to obtain downsampled image data 515. In one or more embodiments, the image processing module 155 may obtain the downsampled image data 515 by taking a subset of the second image data 425. The flow continues by the image processing module 155 directing the downsampled image data 515 to be processed by image processing pipeline A 420. Thus, the same pipeline may be used for the first image data 410 and the downsampled image data 515, but because the downsampled image data 515 includes only a portion of the second image data 425, the downsampled image data 515 is processed by image processing pipeline 420 more efficiently than if the second image data 425 were processed. The result of image processing pipeline A 420 processing the downsampled image data 515, is second processed image data.

After the downsampled image data 515 is processed by image processing pipeline A 420, then the processed image data is upscaled to obtain upscaled image data 520. In one or more embodiments, upscaling the processed downsampled image data results in the second processed image data to return to the same scale as the first processed image data. After the first image data 410 is processed by image processing pipeline A 420 and second processed image data is upscaled, then the first processed image data and the upscaled second processed image data are combined to form composite frame 435. In one or more embodiments, the image processing module 155 determines the region of interest boundaries with respect to the raw image data for the frame, and combines the two sets of processed image data to revert back to the native grid. As described above, the flow diagram 500 may be repeated with the next image data for a next frame of a video feed until the video feed ceases.

Figure 6:
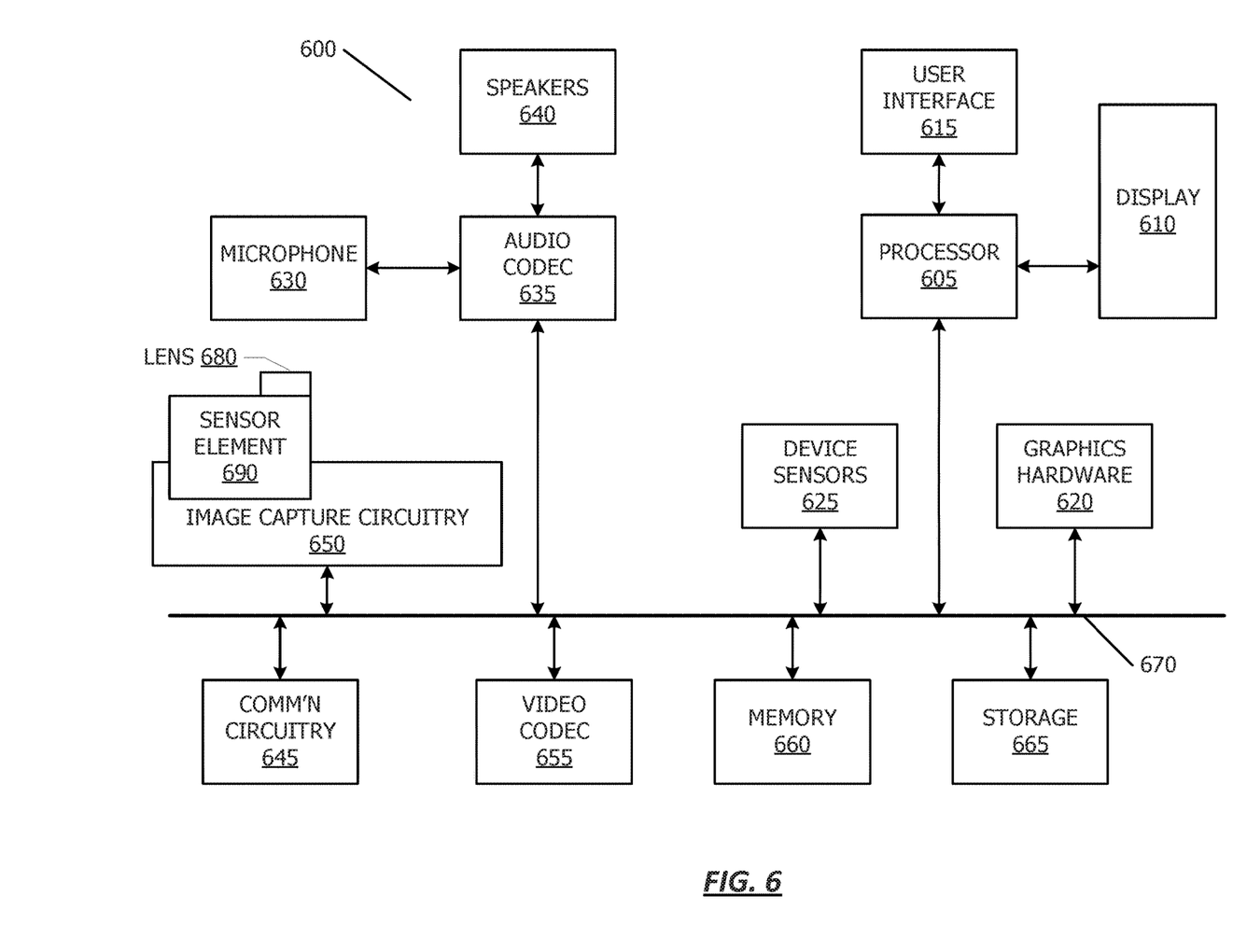
FIG. 6 shows, in block diagram form, a simplified multifunctional device according to one or more embodiments.

Referring now to FIG. 6, a simplified functional block diagram of illustrative multifunction device 600 is shown according to one embodiment. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 (e.g., including camera system 100) video codec(s) 655 (e.g., in support of digital image capture unit 650), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images and single and multi-camera calibration as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include lens assembly 680 associated with sensor element 690. Image capture circuitry 650 may capture still and/or video images. Output from image capture circuitry 650 may be processed, at least in part, by video codec(s) 655 and/or processor 605 and/or graphics hardware 620, and/or a dedicated image processing unit or pipeline incorporated within circuitry 665. Images so captured may be stored in memory 660 and/or storage 655.

Sensor and camera circuitry 650 may capture still and video images that may be processed in accordance with this disclosure, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory computer readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

The scope of the disclosed subject matter therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method for generating an image stream, comprising:
   obtaining image data from a camera corresponding to an image frame;
   identifying a first subset of the image data comprising a region of interest in the image frame;
   identifying a second subset of the image data different than the first subset of the image data;
   processing the first subset of the image data by a first processing pipeline to obtain a first processed set of image data;
   processing the second subset of the image data by a second processing pipeline different than the first processing pipeline to obtain a second processed set of image data, wherein the second processing pipeline renders a lower quality image than the first processing pipeline; and
   combining the first processed set of image data and the second processed set of image data to obtain a processed image frame.

2. The method of claim 1, wherein the first processing pipeline generates greater pixels per degree than the second processing pipeline.

3. The method of claim 1, wherein processing the second subset of the image data by the second processing pipeline comprises:
   downsampling the second subset of the image data to obtain downsampled image data.

4. The method of claim 3, wherein processing the second subset of the image data by the second processing pipeline further comprises processing the downsampled image data using the first processing pipeline.

5. The method of claim 1, further comprising:
   identifying the region of interest based on a view direction of a user.

6. The method of claim 1, further comprising:
   identifying the region of interest based on user input.

7. The method of claim 1, wherein the first subset of the image data comprises less than an entirety of the image data, and wherein the second subset of the image data comprises the entirety of the image data.

8. A non-transitory computer readable medium for generating an image stream comprising computer readable code executable by one or more processors to:
   obtain image data from a camera corresponding to an image frame;
   identify a first subset of the image data comprising a region of interest in the image frame;
   identify a second subset of the image data different than the first subset of the image data;
   process the first subset of the image data by a first processing pipeline to obtain a first processed set of image data;
   process the second subset of the image data by a second processing pipeline different than the first processing pipeline to obtain a second processed set of image data, wherein the second processing pipeline renders a lower quality image than the first processing pipeline; and
   combine the first processed set of image data and the second processed set of image data to obtain a processed image frame.

9. The non-transitory computer readable medium of claim 8, wherein the first processing pipeline generates greater pixels per degree than the second processing pipeline.

10. The non-transitory computer readable medium of claim 8, wherein the computer readable code to process the second subset of the image data by the second processing pipeline comprises computer readable code to:
    downsample the second subset of the image data to obtain downsampled image data.

11. The non-transitory computer readable medium of claim 10, wherein the computer readable code to process the second subset of the image data by the second processing pipeline further comprises computer readable code to process the downsampled image data using the first processing pipeline.

12. The non-transitory computer readable medium of claim 8, further comprising computer readable code to:
    identify the region of interest based on a view direction of a user.

13. The non-transitory computer readable medium of claim 8, further comprising computer readable code to:
    identify the region of interest based on user input.

14. The non-transitory computer readable medium of claim 8, wherein the first subset of the image data comprises less than an entirety of the image data, and wherein the second subset of the image data comprises the entirety of the image data.

15. A system for generating an image stream, comprising:
    a camera;
    one or more processors; and
    a memory coupled to the one or more processors and comprising computer readable code executable by the one or more processors to cause the system to:
      obtain image data from the camera corresponding to an image frame;
      identify a first subset of the image data comprising a region of interest in the image frame;
      identify a second subset of the image data different than the first subset of the image data;

process the first subset of the image data by a first processing pipeline to obtain a first processed set of image data;

process the second subset of the image data by a second processing pipeline different than the first processing pipeline to obtain a second processed set of image data, wherein the second processing pipeline renders a lower quality image than the first processing pipeline; and combine the first processed set of image data and the second processed set of image data to obtain a processed image frame.

16. The system of claim 15, wherein the first processing pipeline generates greater pixels per degree than the second processing pipeline.

17. The system of claim 15, wherein the computer readable code to process the second subset of the image data by the second processing pipeline comprises computer readable code to:

downsample the second subset of the image data to obtain downsampled image data; and process the downsampled image data using the first processing pipeline.

18. The system of claim 15, further comprising computer readable code to:

identify the region of interest based on a view direction of a user.

19. The system of claim 15, further comprising computer readable code to:

identify the region of interest based on user input.

20. The system of claim 15, wherein the first subset of the image data comprises less than an entirety of the image data, and wherein the second subset of the image data comprises the entirety of the image data.

* * * * *